United States Patent Office 3,746,687
Patented July 17, 1973

3,746,687
PHENYLATED AMIDE-QUINOXALINE
COPOLYMERS
James V. Duffy, Beltsville, Md., and Joseph M. Augl,
Sterling, Va., assignors to the United States of America
as represented by the Secretary of the Navy
No Drawing. Filed Nov. 21, 1972, Ser. No. 308,383
Int. Cl. C08g *15/00, 33/02*
U.S. Cl. 260—50                                11 Claims

ABSTRACT OF THE DISCLOSURE

Phenylated amide-quinoxaline copolymers consisting essentially of units of the formula

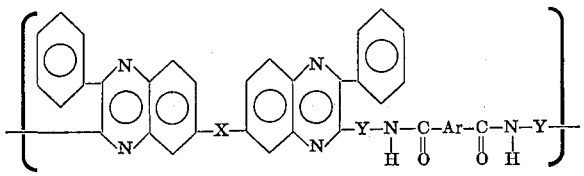

where X is a direct bond,

O, S, SO, or $SO_2$, Y is m or p-phenylene and Ar is ortho, meta or para phenylene or

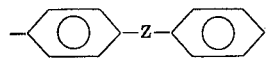

wherein Z is a direct bond,

O, S, SO or $SO_2$ are prepared by contacting a tetramine of the formula

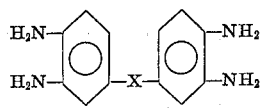

with an amide of the formula

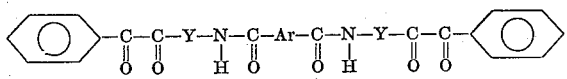

These polymers find use as films or coatings and can also be made into fibers.

BACKGROUND OF THE INVENTION

This invention relates to polymers and more particularly to polyquinoxaline polymers.

Polyquinoxalines are known and have been described in application Ser. No. 876,572, filed Nov. 13, 1969, entitled "Phenylated Polyquinoxalines and Method of Preparation Thereof" by Wolfgang J. Wrasidlo. Furthermore phenylated imide-quinoxaline copolymers are also known and have been disclosed in application Ser. No. 75,248, filed Sept. 24, 1970, entitled "Phenylated Imide-Quinoxaline Copolymers and Method of Their Preparation" by Joseph M. Augl. Additionally, applications Ser. No. 128,-524, filed Mar. 26, 1971, entitled "Soluble Imide-Quinaxoaline Copolymers" by Joseph M. Augl and James V. Duffy and Ser. No. 184,194, filed Sept. 24, 1971, entitled "Polyquinoxalines containing Flexibilizing Groups in the Polymer Chain" by Joseph M. Augl and Wolfgang J. Wrasidlo also discloses similar polymers. Such polymers are known to have good oxidative thermal stability. Additionally some of these polymers, even those with a relatively high molecular weight, are very soluble in common organic solvents. Since these polymers can be used as protective coatings, it is highly desirable that they be easily removed by contacting with common organic solvents so that it is possible to easily inspect or repair materials which have been coated therewith. A continuing search goes on for polymers which can be used as protective coatings and which have good oxidative-thermal stability as well as good solubility in common organic solvents.

SUMMARY OF THE INVENTION

Accordingly, one object of this invention is to provide polyquinoxalines.

Another object of this invention is to provide polyquinoxalines which have good oxidative-thermal stability.

A further object of this invention is to provide polymers which are easy to process into final products.

A still further object of this invention is to provide polyquinoxalines which are readily soluble in common organic solvents.

Yet another object of this invention is to provide polyquinoxalines which can be used as high temperature protective coatings.

Still another object of this invention is to provide polyquinoxalines which can be formed into fibers or films.

These and other objects of this invention are accomplished by providing amide-quinoxaline copolymers of the formula

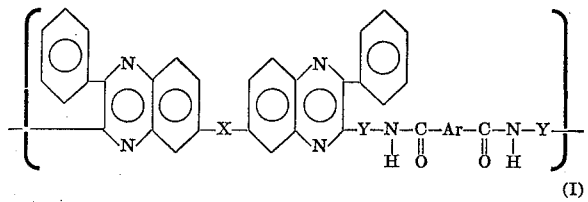
(I)

wherein X is selected from the group consisting of a direct bond,

O, S, SO and $SO_2$, Y is selected from the group consisting of m- and p-phenylene, and Ar is selected from the group consisting of o-, m-, p-phenylene and

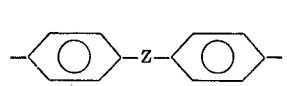

wherein Z is selected from the group consisting of a direct bond,

O, S, SO and $SO_2$. These compounds are formed by contacting a tetramine of the formula

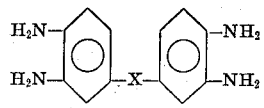
(II)

with an amide of the formula.

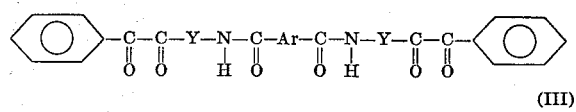
(III)

DESCRIPTION OF THE PREFERRED EMBODIMENT

The polymers of Formula I are prepared by reacting the commercially available tetramines of Formula II with a compound of Formula III. The compounds of Formula III are prepared by reacting 3 or 4-aminobenzil,

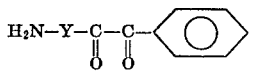

with the appropriate acid chloride of the formula

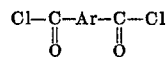

under the standard reaction conditions for preparing carboxylic acid amides. The method of preparing 3 or 4-aminobenzil is fully described in the hereinbefore referred to patent applications.

The polymers of this invention are prepared by solution condensation of the tetramine of Formula II and the amide of Formula III. The condensations proceeded well at about room temperature to yield the desired products. Additionally, the fact that such condensations can be carried out at about room temperature decreases the number of side reactions and hence increases the solubility of the final products.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

A mixture of 0.400 g. (0.00178 mole) of 4-aminobenzil, 0.181 g. (0.00089 mole) of terephthaloyl chloride, and 20 ml. of dry toluene was heated at reflux with stirring until the evolution of HCl was completed (4–5 hr.). The light yellow solid which precipitated upon cooling was filtered and washed with dry toluene. The solid product was purified by refluxing it twice with 100 ml. portions of reagent alcohol to give 0.50 g. (97%) of a grey-yellow solid which had a melting point of 331° C.

The compounds of Formula III wherein Y is para phenylene and Ar is ortho and para-phenylene are prepared using the same procedure but substituting the appropriate starting material. The following table gives the physical properties of the three isomers.

Formula III compounds wherein:

| Y | Ar | Color | M.P. ° C. |
|---|----|-------|-----------|
| p-Phenylene | Ortho-phenylene | Lemon yellow | 213 |
| Do | Meta-phenylene | Light yellow | 233 |
| Do | Para-phenylene | Gray yellow | 331 |

EXAMPLE 2

The polyphenylated amide-quinoxalines were prepared via solution condensation according to the following general procedure:

A 100 ml. three-neck, round bottom flask, fitted with a stirrer, condenser and gas inlet tube was charged with 0.01 mole of tetramine and 0.01 mole of the compound of Formula III. Enough meta-cresol was added to make a 10% polymer solution by weight. The reaction flask was purged with nitrogen and a clear, viscous solution was obtained after the temperature had been raised to 120–130° C. The reaction was heated at 120–130° C. for two hours followed by an additional two hours at reflux in order to complete the reaction. The polymers were isolated as fibrous granular solids by precipitation from methanol or acetone and were then redissolved in either chloroform or meta cresol.

Various polymers prepared by the above procedure are indicated in the following table,

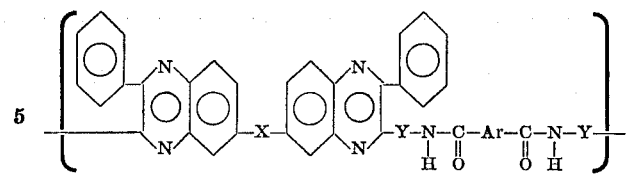

| X | Y | Ar | Inherent viscosity, dl./g. |
|---|---|----|---------------------------|
| Direct bond | p-Phenylene | o-Phenylene | 0.09 |
| —C— ‖ O | do | do | 0.02 |
| O | do | do | 0.02 |
| Direct bond | p-Phenylene | m-Phenylene | 1.85 |
| —C— ‖ O | do | do | 1.20 |
| SO₂ | do | do | 1.20 |
| O | do | do | 1.32 |
| Direct bond | p-Phenylene | p-Phenylene | 1.65 |
| —C— ‖ O | do | do | 1.00 |
| SO₂ | do | do | 0.85 |
| O | do | do | 1.04 |

Viscosities were determined in meta-cresol (0.5 g. in 100 ml. at 30° C.).

Polymers wherein Ar is ortho, meta or para-phenylene are preferred and polymers wherein Ar is meta or para-phenylene are most preferred.

The molecular weight range of the useful polymers of this invention may vary from polymers which have an inherent viscosity of 0.02 to about 3.0 dl./g. with the most preferred range being about 0.75–3.0 dl./g.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Film and fiber forming phenylated amide-quinoxaline copolymers consisting essentially of the repeating unit

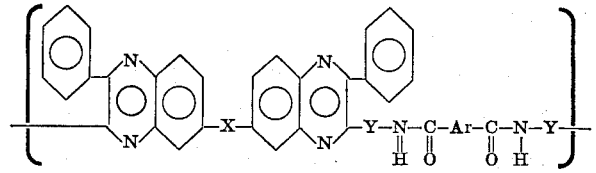

wherein X is selected from the group consisting of a direct bond,

O, S, SO and SO₂, Y is selected from the group consisting of m-phenylene and p-phenylene and Ar is selected from the group consisting of o-phenylene, m-phenylene, p-phenylene and

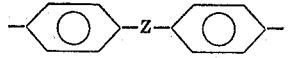

wherein Z is selected from the group consisting of a direct bond,

O, S, SO and SO₂.

2. The phenylated amide-quinoxaline copolymers of claim 1 wherein the inherent viscosity is between 0.02–3.0 dl./g. as a 0.5 g. solution in 100 ml. of meta-cresol at about 30° C.

3. The phenylated amide-quinoxaline copolymers of claim 2 wherein said inherent viscosity is about 0.75–3.0 dl./g. as a 0.5 g. solution in 100 ml. of meta-cresol at about 30° C.

4. The phenylated amide-quinoxaline copolymer of claim 1 wherein Ar is selected from the group consisting of o-phenylene, m-phenylene and p-phenylene.

5. The phenylated amide-quinoxaline copolymer of claim 2 wherein Ar is selected from the group consisting of o-phenylene, m-phenylene and p-phenylene.

6. The phenylated amide-quinoxaline copolymer of claim 4 wherein X is selected from the group consisting of a direct bond,

O and SO$_2$, Y is p-phenylene.

7. The phenylated amide-quinoxaline copolymer of claim 2 wherein X is a direct bond, Y is p-phenylene and Ar is m-phenylene.

8. The phenylated amide-quinoxaline copolymer of claim 2 wherein X is

Y is p-phenylene and Ar is m-phenylene.

9. The phenylated amide-quinoxaline copolymer of claim 2 wherein X is SO$_2$, Y is p-phenylene and Ar is m-phenylene.

10. The phenylated amide-quinoxaline copolymer of claim 2 wherein X is O, Y is p-phenylene and Ar is m-phenylene.

11. The phenylated amide-quinoxaline copolymer of claim 2 wherein X is a direct bond, Y is p-phenylene and Ar is p-phenylene.

References Cited
UNITED STATES PATENTS

| | | | |
|---|---|---|---|
| 3,509,097 | 4/1970 | Hoyt et al. | 260—65 |
| 3,620,997 | 11/1971 | Marvel | 260—50 |
| 3,642,700 | 2/1972 | Augl | 260—50 |
| 3,661,850 | 5/1972 | Stille | 260—50 |

WILLIAM H. SHORT, Primary Examiner

L. L. LEE, Assistant Examiner

U.S. Cl. X.R.

117—161 P; 260—33.4 P, 33.8 R, 65, 78 R, 558 S, 558 R